UNITED STATES PATENT OFFICE.

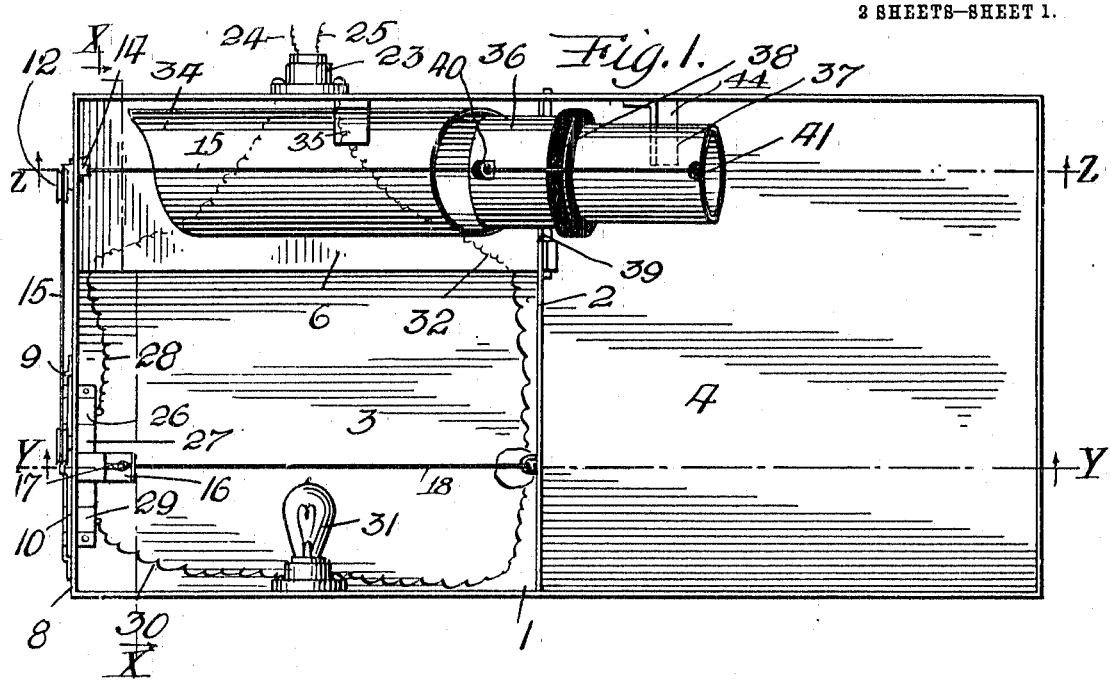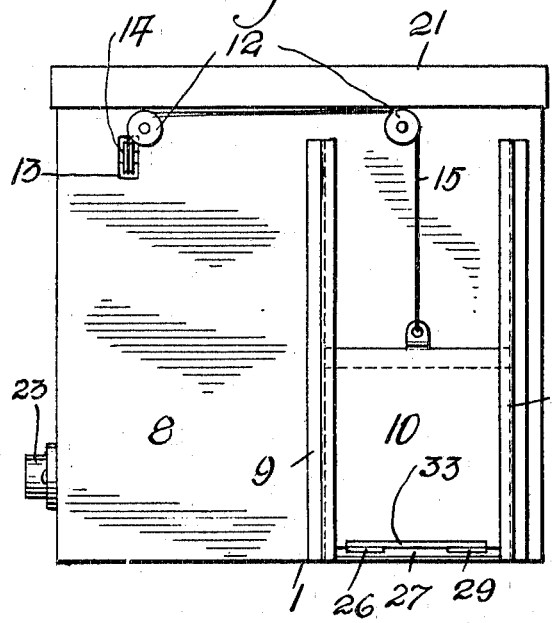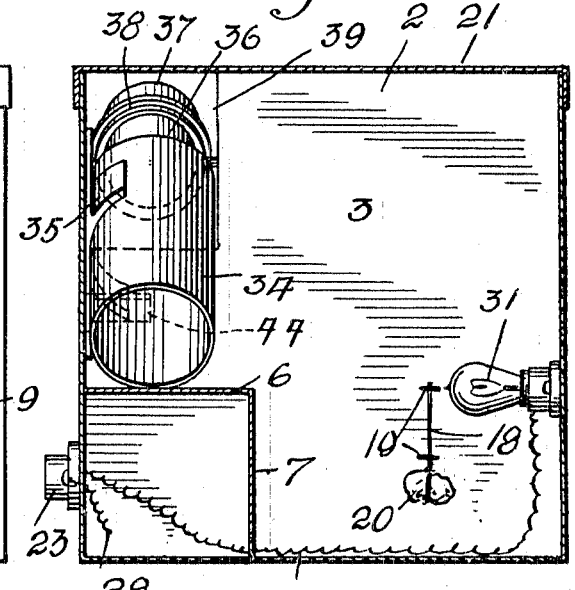

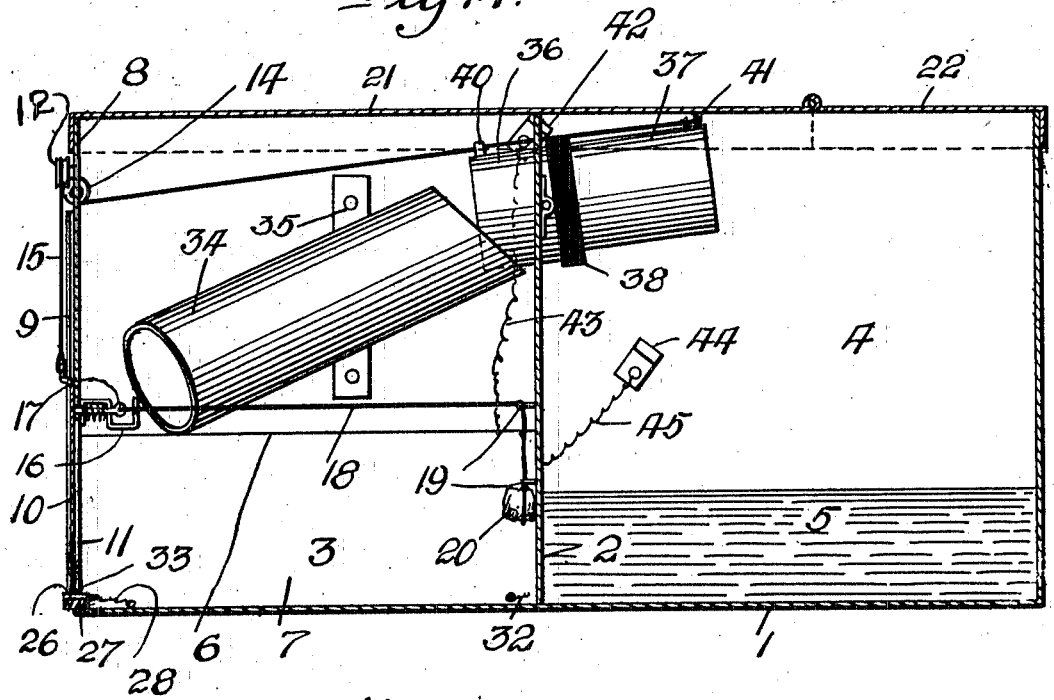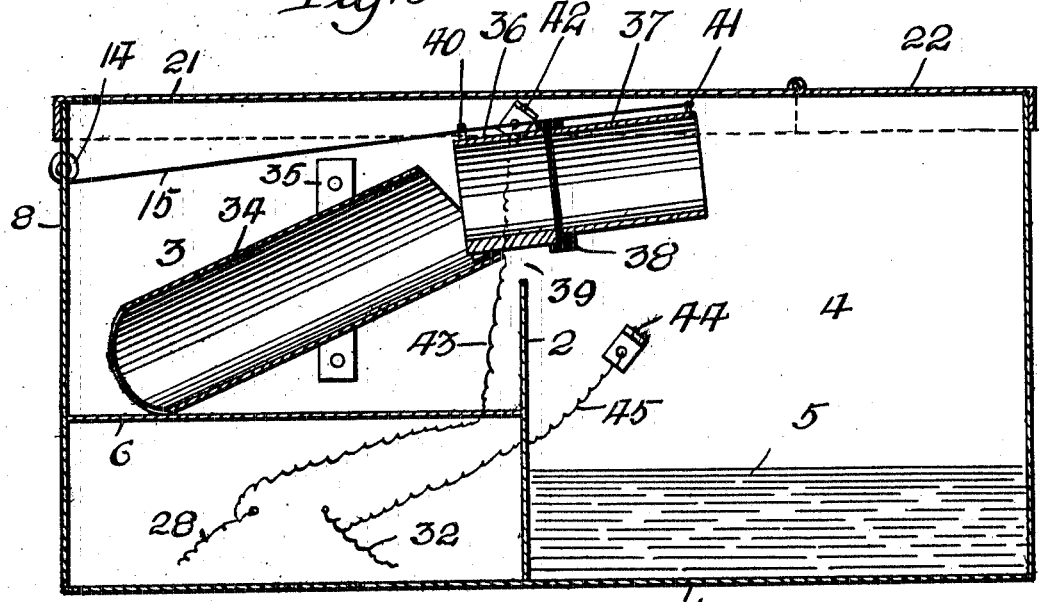

CHARLES WESLEY GRIFFITH, OF ALTOONA, PENNSYLVANIA, ASSIGNOR OF ONE-HALF TO SAMUEL A. TREES, OF ALTOONA, PENNSYLVANIA.

ELECTRIC RAT-TRAP.

1,059,358.　　　　　Specification of Letters Patent.　　Patented Apr. 22, 1913.

Application filed February 23, 1912. Serial No. 679,511.

*To all whom it may concern:*

Be it known that I, CHARLES WESLEY GRIFFITH, a citizen of the United States of America, residing at Altoona, in the county of Blair and State of Pennsylvania, have invented certain new and useful Improvements in Electric Rat-Traps, of which the following is a specification, reference being had therein to the accompanying drawing.

The invention relates to electric rat traps, and has for its object to provide means in a manner as hereinafter set forth for trapping a rodent and electrocuting it if it makes an attempt to leave the compartment in which it is trapped.

A further object of the invention is to provide an electrocuting rat trap with means, in a manner as hereinafter set forth, for drowning the rodent if he should not be electrocuted when attempting to escape from the compartment in which he is trapped.

Further objects of the invention are to provide an electric rat trap which is comparatively simple in its construction and arrangement, strong, durable, efficient and convenient in its use, readily set up, and comparatively inexpensive to manufacture.

With the foregoing and other objects in view, the invention consists in the novel construction, combination, and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In describing the invention in detail, reference is had to the accompanying drawings, wherein like reference characters denote corresponding parts throughout the several views, and in which—

Figure 1 is a top plan view of an electric rat trap in accordance with this invention. Fig. 2 is an end view thereof. Fig. 3 is a cross-sectional view on line X—X of Fig. 1. Fig. 4 is a longitudinal sectional view on line Y—Y of Fig. 1. Fig. 5 is a longitudinal-sectional view on line Z—Z of Fig. 1. Fig. 6 is a detail illustrating the circuit closing plate.

Referring to the drawings in detail, the body of the trap is formed rectangularly in contour and is indicated by the reference character 1 and is preferably constructed of metallic material. Within the body 1 is arranged a partition 2 forming the body of the trapping compartment 3 and of the well 4, which contains a body of water 5. Within the trapping compartment 3 is arranged a ledge 6 formed by an angle-shaped piece of material 7, which is suitably secured to the inner face of the body 1.

The front end of the body 1 which is indicated by the reference character 8, is provided at one side with a pair of vertically disposed guides 9 for a door 10, the latter being adapted to close the entrance 11 to the trapping compartment 3.

Rotatably mounted upon the front of the body 1 near the top thereof is a pair of pulleys 12, and journaled in the opening 13, formed in the front end 8 of the body 1 is a pulley 14. Connected to the door 10 and traveling over the pulleys 12, 14, is a cable 15, which is utilized in the manner as hereinafter set forth to reset the trap, or in other words, to leave the door 10 so that it can be engaged by a suitable catch and be maintained in an elevated position, thereby opening the entrance 11 to the trapping compartment.

Secured to the inner face of the front end 8 of the body 1 is an inwardly extending bracket 16 carrying a spring-controlled keeper 17, the function of the latter is to project forwardly and engage the lower edge of the door 10 so as to maintain it in an elevated position. When the keeper 17 is pulled inwardly, the door is lowered thereby closing the trapping compartment 3.

Connected to the keeper 17 is a cable 18 which extends down through a pair of eyes 19 which are connected to the inner face of the partition 2. The cable 18 depends below the lower of the eyes 19 and carries a bait 20. It will be assumed that the trapping compartment 3 is open and a rodent enters the same, he immediately makes for the bait 20 and as he pulls upon the same, the cable is drawn inwardly, moving the keeper 17 from below the lower end of the door 10 and the latter falls by gravity to a closed position whereby the rodent is trapped in the compartment 3.

The cover of the body is indicated by the reference character 21 and includes a hinged portion 22 which is arranged over the well 4, so that a portion of the cover can be elevated and the rodents removed from the well 4 when occasion so requires. The manner in which the rodents are discharged into the well 4 will be presently referred to.

Secured to one side of the body 1 is a plug 23 for the leading-in wires 24, 25. Leading from the plug 23 to a contact plate 26 mounted in a bar of insulation 27 is a circuit-forming wire 28. The plate 26 is positioned near one end of the bar 27 and mounted in said bar, in proximity to its other end, is a contact plate 29, from which leads the circuit wire 30, the latter extending to a lamp 31 secured to one side of the body 1. Leading from the plug 23 to the lamp 31 is a circuit wire 32. The door 10 carries at its lower end a circuit closing member 33, which, when the door falls to closed position, engages the plates 26 and 29 and closes the lamp circuit 31, whereby the lamp will be illuminated to startle or frighten the rodent.

Arranged within the trapping compartment 3 and over the ledge 6 is an inclined tube 34 which is maintained in position by a bracket 35. The tube 34 extends in proximity to the partition 2, and extending into the upper end of the tube 34 is the weighted section 36 of a pivoted tubular member, the other section, being indicated by the reference character 37, is longer than the section 36 and is connected to and insulated from the latter by a band of non-conducting material 38. The section 37 is formed of conducting material. The weighted section 36 normally maintains the section 37 elevated. The tubular member is pivoted in an opening 39 formed at the top of the partition 2. To the section 36 is connected an eye 40, through which extends the cable 15, the latter being fixed to the free end of the section 37, as at 41. The section 36 is also formed of conducting material and when the tubular member is tilted so as to lower the section 37, the section 36 engages with a contact 42 to which is connected a circuit wire 43 leading from the wire 28. When the tubular member is tilted so as to lower the section 37, the latter engages with the contact 44 to which leads a circuit wire 45, the latter being connected to the circuit wire 32. The tubular member projects into the well 4 for a purpose to be presently referred to. When the tubular member is tilted so as to lower the section 37, the cable 15 is carried therewith, elevating the door 10 so that the keeper 17 can project forwardly, the keeper engaging under the door 10 and resetting the trap. The tilting of the tubular member is had through the medium of the weight of the rodent and which is now referred to.

It will be assumed that the rodent has been caught in the chamber 3 and the door 10 lowered closing the circuit to illuminate the lamp. The rodent will then try to escape from the trapping chamber 3 and will jump upon the ledge 6, travel up to the tube 34 and into the tubular member. As the rodent crawls through the tubular member, the latter will be tilted downwardly, closing the circuit through the rodent, due to the fact that one part of the rodent will engage the section 36 and the other section 37, under such conditions electrocuting the rodent, and as the member will be tilted, the rodent will be discharged into the body of water within the well 4. If, through any cause the rodent is not electrocuted in the tubular member, he will be discharged therefrom into the body of water 5 and drowned.

What I claim is:

1. A rat trap comprising a body portion including a trapping compartment having an entrance opening, a vertically movable door for closing said opening, a keeper for maintaining said door in an elevated position above said opening, a cable connected to said keeper, a bait attached to the cable and adapted to be attacked by the rodent whereby said cable is pulled and the keeper released from below the door so that the latter can close said entrance opening, a lamp within said compartment, means in lamp within said lamp whereby an electric circuit with said lamp whereby an electric circuit is formed when said door closes said opening to illuminate said trapping compartment to startle the rodent, a second compartment communicating with said trapping compartment and trapping devices coöperating with said compartments and discharging into said second compartment.

2. A rat trap comprising the combination with a trapping compartment, of a tube leading toward one wall of said compartment, a tubular member formed of two sections, one of said sections of greater length than the other, said shorter section being weighted and normally extending into said tube and extending through said wall, insulation means supporting said elongated section from said shorter section, means for pivotally connecting said insulation means to said wall thereby permitting of said member to be tilted by the weight of a rodent against the action of the weighted short section, a pair of contacts, circuit forming wires leading to said contacts, said contacts adapted to be engaged by the sections of said member for forming an electrocuting circuit when said member is tilted by the weight of a rodent, said circuit being closed through the rodent.

In testimony whereof I affix my signature in the presence of two witnesses.

CHARLES WESLEY GRIFFITH.

Witnesses:
SAMUEL A. TREES,
PATRICK J. RYDER.